(12) United States Patent
Rafac (10) Patent No.: US 7,317,536 B2
(45) Date of Patent: Jan. 8, 2008

(54) SPECTRAL BANDWIDTH METROLOGY FOR HIGH REPETITION RATE GAS DISCHARGE LASERS

(75) Inventor: Robert J. Rafac, Carlsbad, CA (US)

(73) Assignee: Cymer, Inc., San Diego, CA (US)

( * ) Notice: Subject to any disclaimer, the term of this patent is extended or adjusted under 35 U.S.C. 154(b) by 195 days.

(21) Appl. No.: 11/169,202

(22) Filed: Jun. 27, 2005

(65) Prior Publication Data

US 2007/0013913 A1    Jan. 18, 2007

(51) Int. Cl.
    *G01B 9/02* (2006.01)
(52) U.S. Cl. .................................. 356/454; 356/519
(58) Field of Classification Search ............... 356/454, 356/519
    See application file for complete search history.

(56) References Cited

U.S. PATENT DOCUMENTS

| | | | |
|---|---|---|---|
| 4,223,279 A | 9/1980 | Bradford, Jr. et al. ..... 331/94.5 |
| 4,455,658 A | 6/1984 | Sutter et al. ................... 372/38 |
| 4,959,840 A | 9/1990 | Akins et al. ................... 372/57 |
| 5,023,884 A | 6/1991 | Akins et al. ................... 372/57 |
| 5,025,445 A | 6/1991 | Anderson et al. .............. 372/20 |
| 5,025,446 A | 6/1991 | Kuizenga ....................... 372/21 |
| 5,189,678 A | 2/1993 | Ball et al. ....................... 372/28 |
| 5,313,481 A | 5/1994 | Cook et al. .................... 372/37 |
| 5,315,611 A | 5/1994 | Ball et al. ....................... 372/56 |
| 5,359,620 A | 10/1994 | Akins ........................... 372/58 |
| 5,373,515 A * | 12/1994 | Wakabayashi et al. ...... 356/519 |
| 5,448,580 A | 9/1995 | Birx et al. ...................... 372/38 |
| 5,471,965 A | 12/1995 | Kapich ......................... 123/565 |
| 5,852,621 A | 12/1998 | Sandstrom .................... 372/25 |
| 5,863,017 A | 1/1999 | Larson et al. ............. 248/176.1 |
| 5,953,360 A | 9/1999 | Vitruk et al. .................. 372/87 |
| 5,970,076 A | 10/1999 | Hamada ....................... 372/20 |
| 5,978,394 A | 11/1999 | Newman et al. .............. 372/32 |
| 5,991,324 A | 11/1999 | Knowles et al. .............. 372/57 |
| 6,005,879 A | 12/1999 | Sandstrom et al. ........... 372/25 |
| 6,016,325 A | 1/2000 | Ness et al. ..................... 372/38 |

(Continued)

OTHER PUBLICATIONS

"Contribution of Polychromatic Illumination to Optical Proximity Effects in the Context of Deep-UV Lithography," A. Kroyan, I. Lalovic, N. R. Farrar, *Proc. 21st Annual BACUS Symposium on Photomask Tech. and Management*, G.T. Dao and B. J. Grenon (Eds). Monterey CA. SPIE vol. 4562, pp. 1112-1120, 2002.

(Continued)

*Primary Examiner*—Samuel A. Turner
(74) *Attorney, Agent, or Firm*—William Cray (57) ABSTRACT

A bandwidth meter apparatus and method for measuring the bandwidth of a spectrum of light emitted from a laser input to the bandwidth meter which may comprise an optical bandwidth monitor providing a first output representative of a first parameter which is indicative of the bandwidth or the light emitted from the laser and a second output representative of a second parameter which is indicative or the bandwidth of the light emitted from the laser; and, an actual bandwidth calculation apparatus utilizing the first output and the second output as part of a multivariable equation employing predetermined calibration variables specific to the optical bandwidth monitor, to calculate an actual bandwidth parameter; the multivariable equation comprising a symmetry sensitive term.

60 Claims, 3 Drawing Sheets
(2 of 3 Drawing Sheet(s) Filed in Color)

U.S. PATENT DOCUMENTS

| | | | |
|---|---|---|---|
| 6,018,537 A | 1/2000 | Hofmann et al. | 372/25 |
| 6,028,880 A | 2/2000 | Carlesi et al. | 372/58 |
| 6,043,883 A | 3/2000 | Leckel et al. | 356/346 |
| 6,067,311 A | 5/2000 | Morton et al. | 372/57 |
| 6,094,448 A | 7/2000 | Fomenkov et al. | 372/102 |
| 6,104,735 A | 8/2000 | Webb | 372/37 |
| 6,128,323 A | 10/2000 | Myers et al. | 372/38 |
| 6,151,349 A | 11/2000 | Gong et al. | 372/58 |
| 6,164,116 A | 12/2000 | Rice et al. | 73/1.72 |
| 6,192,064 B1 | 2/2001 | Algots et al. | 372/99 |
| 6,208,674 B1 | 3/2001 | Webb et al. | 372/57 |
| 6,208,675 B1 | 3/2001 | Webb | 372/58 |
| 6,219,368 B1 | 4/2001 | Govorkov | 372/59 |
| 6,240,117 B1 | 5/2001 | Gong et al. | 372/58 |
| 6,317,448 B1 | 11/2001 | Das et al. | 372/60 |
| 6,320,663 B1 * | 11/2001 | Ershov | 356/454 |
| 6,330,261 B1 | 12/2001 | Ishihara et al. | 372/38.1 |
| 6,359,693 B2 | 3/2002 | Smith et al. | 356/519 |
| 6,414,979 B2 | 7/2002 | Ujazdowski et al. | 372/87 |
| 6,477,193 B2 | 11/2002 | Oliver et al. | 372/58 |
| 6,480,275 B2 | 11/2002 | Sandstrom et al. | 356/328 |
| 6,539,046 B2 | 3/2003 | Newman et al. | 372/98 |
| 6,580,517 B2 | 6/2003 | Lokai et al. | 356/519 |
| 6,621,580 B2 | 9/2003 | Myatt et al. | 356/519 |
| 6,625,191 B2 | 9/2003 | Knowles et al. | 372/55 |
| 6,690,704 B2 | 2/2004 | Fallon et al. | 372/58 |
| 6,693,939 B2 | 2/2004 | Klene et al. | 372/58 |
| 6,757,316 B2 | 6/2004 | Newman et al. | 372/57 |
| 2002/0006149 A1 | 1/2002 | Spangler et al. | 372/61 |
| 2002/0048288 A1 | 4/2002 | Kroyan et al. | 372/20 |
| 2002/0101589 A1 | 8/2002 | Sandstrom et al. | 356/334 |
| 2002/0154668 A1 | 10/2002 | Knowles et al. | 372/55 |
| 2002/0154671 A1 | 10/2002 | Knowles et al. | |
| 2002/0163650 A1 * | 11/2002 | May | 356/519 |
| 2003/0012234 A1 | 1/2003 | Watson et al. | |
| 2003/0099269 A1 | 5/2003 | Ershov et al. | |
| 2003/0118072 A1 | 6/2003 | Wittak et al. | |
| 2003/0138019 A1 | 7/2003 | Rylov et al. | |

OTHER PUBLICATIONS

"Understanding Chromatic Aberration Impacts on Lithographic Imaging," K. Lai, I. Lalovic, R. Fair, A. Kroyan, C. Progler, N. R. Farrar, D. Ames, K. Ahmed, *J. Microlithography, Microfabrication and Microsystems*, vol. 2 Issue 2, pp. 105-111, 2003.

"Modeling the Efects of Excimer Laser Bandwidth on Lithographic Performance" A. Kroyan, J. J. Bendik, O. Semprez, N.R. Farrar, C.G. Rowan and C.A. Mack, SPIE vol. 4000, *Optical Microlithography XIII*, pp. 658-664, Mar. 2000.

* cited by examiner

SPECTRAL BANDWIDTH METROLOGY FOR HIGH REPETITION RATE GAS DISCHARGE LASERS

RELATED APPLICATIONS

This application is related to U.S. patent application Ser. No. 10/789,328, entitled IMPROVED BANDWIDTH ESTIMATION, filed on Feb. 27, 2004, which is a continuation-in-part of Ser. No. 10/615,321, filed on Jul. 7, 2003, entitled OPTICAL BANDWIDTH METER FOR LASER LIGHT, with inventor Rafac, and this application is also related to Ser. No. 10/109,223, filed on Jun. 26, 2003, entitled METHOD AND APPARATUS FOR MEASURING BANDWIDTH OF AN OPTICAL OUTPUT OF A LASER, also with Rafac as an inventor, and is also related to Ser. No. 10/676,175, entitled GAS DISCHARGE MOPA LASER SPECTRAL ANALYSIS MODULE, filed on Sep. 30, 2003, all assigned to the assignee of the present application, the disclosures of each of which are hereby incorporated by reference.

FIELD OF THE INVENTION

The present invention is related to on-board spectral width measuring mechanisms utilized, e.g., in high repetition rate gas discharge lasers for, e.g., semiconductor microlithography applications.

BACKGROUND OF THE INVENTION

As the requirements for gas discharge laser systems, e.g., excimer and molecular fluorine gas discharge laser systems, e.g., used for semiconductor photolithography become ever more demanding, e.g., going to 0.12 pm FWHM and 0.25 E95% (E95) for next generation lithography tool usage, e.g., for attaining the desired critical dimensions and the like when exposing mask patterns onto a wafer bearing photoresist, it has become apparent that spectral symmetry changes could "fool" a laser bandwidth measuring apparatus (wavemeter) using, e.g., an empirical or semi-empirical bandwidth estimation model into predicting an incorrect E95 bandwidth, e.g., from the fringe widths of an etalon spectrometer, applied, e.g., to a linear array of photodiodes "PDA" for location and fringe intensity measurement and spectral width intensity measurements.

Applicant has developed a method and apparatus for dealing with this problem.

SUMMARY OF THE INVENTION

A bandwidth meter apparatus and method for measuring the bandwidth of a spectrum of light emitted from a laser input to the bandwidth meter is disclosed which may compaise an optical bandwidth monitor providing a first output representative of a first parameter which is indicative of the bandwidth of the light emitted from the laser and a second output representative of a second parameter which is indicative of the bandwidth of the light emitted from the laser; and, an actual bandwidth calculation apparatus utilizing the first output and the second output as part of a multivariable equation employing predetermined calibration variables specific to the optical bandwidth monitor, to calculate an actual bandwidth parameter; the multivariable equation including a term sensitive to the symmetry of the spectrum of light emitted from the laser. The actual bandwidth parameter may comprise a spectrum full width at some percent of the maximum within the full width of the spectrum of light emitted from the laser ("FWXM") or a width between two points on the spectrum defining a content of the spectrum enclosing some percentage of the energy of the full spectrum of the spectrum of light emitted from the laser ("EX"). The bandwidth monitor may comprise an etalon spectrometer and the first output may be representative of at least one of a width of a fringe of an optical output of the etalon at FWXM or a width between two points on the spectrum enclosing some percentage of the energy of the fall spectrum of light emitted from the laser ("EX'") and the second output may be representative of at least one of a second FWX"M or EX''', where X≠X'' and X'≠X'''. The Functional form of the relationship between the measured parameters and output parameters and the precomputed calibration variables that are part of this function may be derived from a measurement of the value of the actual bandwidth parameter utilizing a trusted standard, correlated to the occurrence of the first and second outputs for a calibration spectrum. The value of the actual bandwidth parameter may for example be calculated from the equation:

Estimared actual $BW$ parameter=$A*w1+B*w2+C+S$ where $w_1$=the first measured output representative of FWXM or EX' and $W_2$ is the second measured output representative of FWX"M or EX''', A, B, and C are adjustable parameters found during calibration, and S is a term sensitive to the symmetry of the spectrum interrogated by the device. The symmetry sensitive term may comprise a correction for error in the actual bandwidth parameter due to a change in the symmetry of the spectrum of light emitted from the laser, which may comprise the difference between midpoint positions, in wavelength space, of two intervals spanning the fringe of an etalon spectrometer taken at different fractions or thresholds of the peak intensity. The two thresholds may be selected to be far enough apart to be sufficiently sensitive to small asymmetries in a fringe pattern utilized to measure the first parameter and the second parameter. The apparatus and method may comprise an optically dispersive instrument, dispersing the energy comprising the output of a laser light source into a spatial or temporal domain according to the wavelength distribution of the energy of the laser light source; a detector, recording, respectively, the spatial or ternpoml variation of the dispersed energy and providing an output signal based upon the recorded spatial or temporal variation; a first calculation apparatus, calculating the width of the wavelength distribution of the energy, respectively, in the space or time domain, based upon, respectively, the spatial or temporal variation of the dispersed energy recorded by the detector, and converting, respectively, the spatial or temporal distribution into the wavelength domain according to the optical properties of the dispersive instrument; and a second calculation apparatus, utilizing at least one width of the wavelength distribution or the energy in the wavelength domain, calculated by the first calculation apparatus, by applying the at least one width as an argument of a multivariable equation having predetemiined calibration variables specific to the optical source, the dispersive instrument, the detector, and the at least one width taken as an argument; the equation comprising a symmetry term. The first calculation apparatus and the second calculation apparatus may comprise the same calculation apparatus. The at least one width may comprise at least two widths selected from the group comprising a spectrum full width at some percent of the maximum within the full width of the spectrum of light emitted from the light source ("FWXM") and ("FWX'M"), and a width between two points on the spectrum defining a content of the spectrum enclosing some percentage of the energy of the full spectrum of the spectrum of light emitted from the light source ("EX'''") and ("EX''''"), where X≠X' and X"≠X'". The multivariable equation may be evaluated to calculate an actual bandwidth parameter descriptive of the spectral distribution of the energy output by the light source selected from the group FWX*M, EX**. The multivariable equation may be evaluated to calculate an actual bandwidth parameter descriptive of the spectral distribution of the energy output by the light source selected from the group FWX*M, EX**, wherein X* may equal either X or X' and X** may equal either X" or X'". The multivariable equation may comprise E95~=A(x,y)*FWx %+B(x,y)*FWy %+C(A,B;x,y)*(midpoint(x %)−midpoint(y %))+D.

The spectrometer may be for use in on-board high repetition rage gas discharge laser systems for pulse to pulse wavelength measurement with high accuracy using a linear array of photodiodes for detection of fringes and may comprise an etalon providing a fringe pattern to the linear array of photodiodes; and a fringe order positioning mechanism moving the fringe order being measured to as more favorable position on the photodiode array. The fringe order positioning mechanism may position the fringe order to a shallower angle where the local pixel dispersion (dλ/dR) on the linear array is sufficiently small. The signal from the bandwidth measurement computer may be generated upon detection of an unfavorable fringe order local pixel dispersion.

Plane-etalon spectrometers as commonly used for process metrology in light sources for semiconductor photolithography make use of spatial dispersion of the input light by imaging the interference pattern onto a detector comprised of a linear array or grid of regularly-spaced pixels. The equation governing the angular dispersion of the input light by such a spectrometer is $\theta = \cos^{-1}(m\lambda/2d)$, where $\theta$ is the angle of inclination at which the light exits the etalon for the $m^{th}$ order at wavelength $\lambda$, and d is the optical path length between the reflecting surfaces of the plane etalon. This equation can be used to find the wavelength change across a single pixel of the detector, i.e., if f is the imaging focal length of the device and R is the position on the detector relative to the $\theta=0$ position, $d\lambda = \lambda/f \tan(R/f)dR \approx (\lambda R/f)dR$ for R/f<<1. Hence, the resolution of the sampling in wavelength by the uniform array of pixels (e.g., with spacing dR) decreases roughly linearly as a function of the position R at which the image falls on the detector. To maximize the available sampling resolution for the given pixel spacing which is fixed by the choice of the detector, $\theta$ can be altered to make R as small as practical. This can be done by choosing a different order m, tuning the input wavelength $\lambda$ to a different value, or by adjusting the optical path length d.

According to aspects of an embodiment of the present invention the selection of m can be such that dλ/dR is minimized for the measurement to be performed. This invention may also comprise the adjustment of the optical path length d such that dλ/dR is minimized for a particular choice of fringe order m and operating wavelength $\lambda$.

BRIEF DESCRIPTION OF THE DRAWINGS

The application file contains at least one drawing executed in color. Copies of this patent or patent application publication with color drawing(s) will be provided by the Office upon request and payment of the necessary fee.

In this manner an output from the array will be understood by those skilled in the art to be a discussion of the laser output light in the spatial domain. It will further be understood that the bandwidth detector may use a single photodiode scanned with the fringe pattern, such as by using the etalon tilting mechanism described elsewhere herein. This will produce a dispersion of the laser output light in a temporal domain.

DETAILED DESCRIPTION OF PREFERRED EMBODIMENTS

To increase the robustness of, e.g., a two-level fringe-width E95 bandwidth estimation model it has come to applicant's attention that the symmetry of the spectra output from a wavemeter as previously used by applicant's assignee's laser systems, e.g., with wavemeters disclosed in one or more of the above referenced co-pending applications, is not entirely adequately constrained.

By way of modification of the previously proposed two-level semi-empirical E95 estimation model, as disclosed in the above referenced application Ser. No. 10/789,328, entitled IMPROVED BANDWIDTH ESTIMATION, filed on Feb. 27, 2004, applicant propose certain improvements. The wavemeter proposed in the referenced application Ser. No. 10/789,328 may take as input the full-widths (FW) of a fringe of an etalon spectrometer measured at two different heights on the fringe (intensity fractions, e.g., full width at x % of the maximum "FWXM" and full width at y % percent of the maximum "FWYM", where X may be, e.g., 25% and Y may be, e.g., 75%). The wavemeter may then use these values as computed, e.g., from the intensity levels of pixels in a photodiode array ("PDA"), e.g., PDA 40 as described in the above referenced applications and below in more detail, in a plane model to estimate, e.g., the E95 bandwidth (that portion of the spectrum on either side of the peak of the spectrum within which some percentage x %, in this case 95% of the spectral energy lies, i.e., EX % of EX) of the spectrum illuminating the device. Etalons are conveniently used in wavemeters such as these as is well known in the art for on-board high repetition rate wavelength and bandwidth detection (actually estimation, since the act of measurement, e.g., in a fringe pattern generator like an etalon, induces errors in the actual detection of the bandwidth which can be reduced or compensated for in calculating the estimated bandwidth by a spectral analysis computer, such as computer 60 discussed below, but cannot practically be entirely eliminated, especially in a cost effective and high speed on-board wavemeter for laser systems of the type on which the present invention is to be utilized.

The original model as disclosed in above referenced co-pending prior patent applications was:

$$E95 \sim = A(x,y)*FWx\ \% + B(x,y)*FWy\ \% + C$$

Where A, B, and C are constants that depend on the heights at which the fringes are measured x,y. A, B, and C can be determined experimentally (calibrated) by measurements, as previously disclosed.

Figure 1:
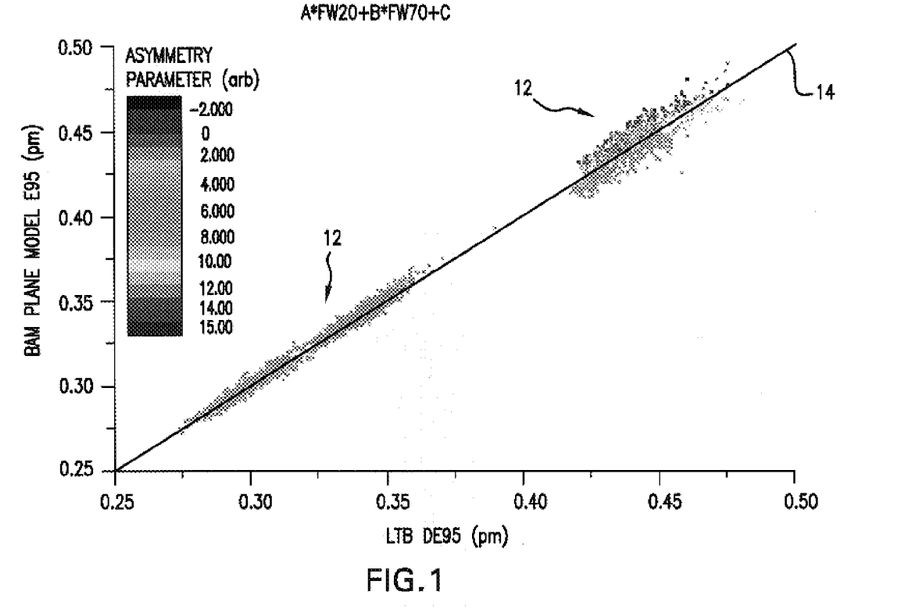
FIG. 1 shows a plot of simulated measurements of a parameter representative of bandwidth of a laser output spectrum without symmetry correction according to aspects of an embodiment of the present invention.

Applicant has observed that this model may not always work well, e.g., in the presence of variations of the symmetry of the illuminating spectrum. This is illustrated in the plot, shown in FIG. 1, which shows a simulation of E95 modeling using the above equation applied to real laser spectra, e.g., measured on a Cymer XLA 105 master oscillator-power amplifier (MOPA") laser system and representing the widths of etalon fringes imaged onto pixels of a PDA. In FIG. 1 it can be seen that the population of points 12 on the right have a much larger dispersion about the parity line 14, i.e., the line where the wavemeter fringe intensity outputs calculated bandwidth results compare exactly to measurement of the same spectra with a more expensive and larger but more highly accurate spectrometer, e.g., an LTB grating spectrometer. This larger deviation corresponds to a larger error. The points are mapped to a symmetry metric (color values).

The symmetry metric in these plots (color values) is proportional to the deviation of the peak of the spectrum from the center of the energy of the spectrum. These vary from around 2-8 for the plotted values in the left hand portion of the plot with the values around 2-4 generally below the parity line and the values around 7-8 generally distributed above the parity line and the values around 5-6 distributed on both sides of the parity line. Values from around 11-14 are shown to be distributed above the parity line in the right hand portion of the plot of FIG. 1, with the higher values generally grouped further from the parity line and from around 4-6 distributed below the parity line in the right hand portion of the plot, with the lower values generally grouped further from the parity line and with the values from about 7-10 distributed on both sides of the parity line.

Applicant has determined and it can be seen that the offending points 12 are distributed about the parity line 14 unequally according to their symmetry. The observed correlation between the amount of error and the size of the spectral asymmetry parameter indicates that there is a greater error in the measured bandwidth parameter, e.g., E95 for which the bandwidth detector 40 had been calibrated and it is symmetry related.

Therefore, applicant proposes to add an additional term S(A,B,C;x,y) that is sensitive to symmetry to the above E95 model equation to, e.g., compensate for this ambiguity.

This term S can take many forms, e.g., the difference between the integrals of the left and right halves of a spectrum or fringe, but a particularly convenient formulation is just the difference of the midpoint positions (in wavelength space) of the two width segments x,y, provided that they are far enough apart, e.g., to be sensitive to small asymmetries in the etalon fringe. If the points at which the 70% threshold intercepts the fringe are a(70) and b(70), the FW70=(b(70)−a(70)) and the M(70)=(a(70)+b(70))/2. Similarly FW(20)=(b(20)−a(20)) and M(20)=(a(20)+b(20))/2. A asymmetry metric is then, e.g., the interval between the two midpoint positions, i.e., M(70)−M(20).

$$E95 \sim = A(x,y)*FWx \% + B(x,y)*FWy \% + C(A,B,x,y) + D(A,B,C;x,y)*(\text{midpoint}(x \%) - \text{midpoint}(y \%))$$

where as previously noted in art above referenced co-pending application, and repeated below, A(x,y) and B(x,y) are constants pre-corriputed in a calibration process and related to spectral width measurements used in the calibration process, and where C is a similarly computed calibration constant that is a function of A,B, and x and y and is computed in the calibration process by minimization of the error between the model and a trusted reference for an experimentally measured population oF spectra, e.g., by minimization of the least-squares deviation. D is a constant also computed in the calibration process as discussed below in regard to the constant C in the previously used equation, and is a function of (A,B,C,x and y).

Figure 2:
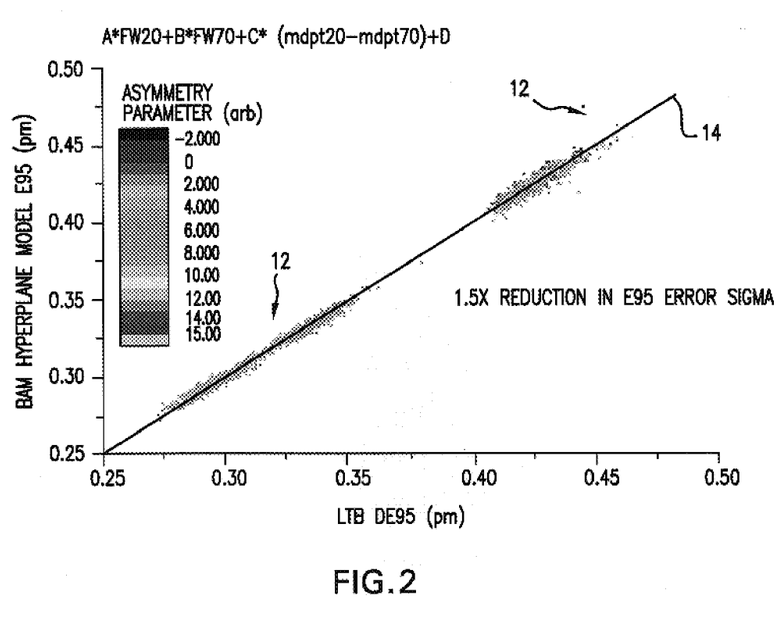
FIG. 2 shows a plot of simulated measurements of a parameter representative of bandwidth of a laser output spectrum with symmetry correction according to aspects of an embodiment of the present invention.

FIG. 2 shows the same simulation using the improved model.

The offending points in both groups on the right and left of the plot in FIG. 2 are more uniformly distributed about the parity line with the improved model, and the systematic error from symmetry changes is thus suppressed. The performance for the data points on the right portion of the plot is significant but somewhat less dramatic.

According to aspects of an embodiment of the present invention the, e.g., etalon spectrometer 40 may have sufficient resolution to make a sensitive enough symmetry measurement, for example, the sampling resolution in the presence of noise can be, e.g., sufficient that the difference between, e.g., M70-M20 is a meaningful number, i.e., can be measured with sufficient precision to be useful as will be understood by those skilled in the art. If, e.g., the measured value is mostly noise, all that is added to the model is mostly noise representing the "actual bandwidth parameter" that is being modeled in terms of "measured parameters.".

Figure 3:
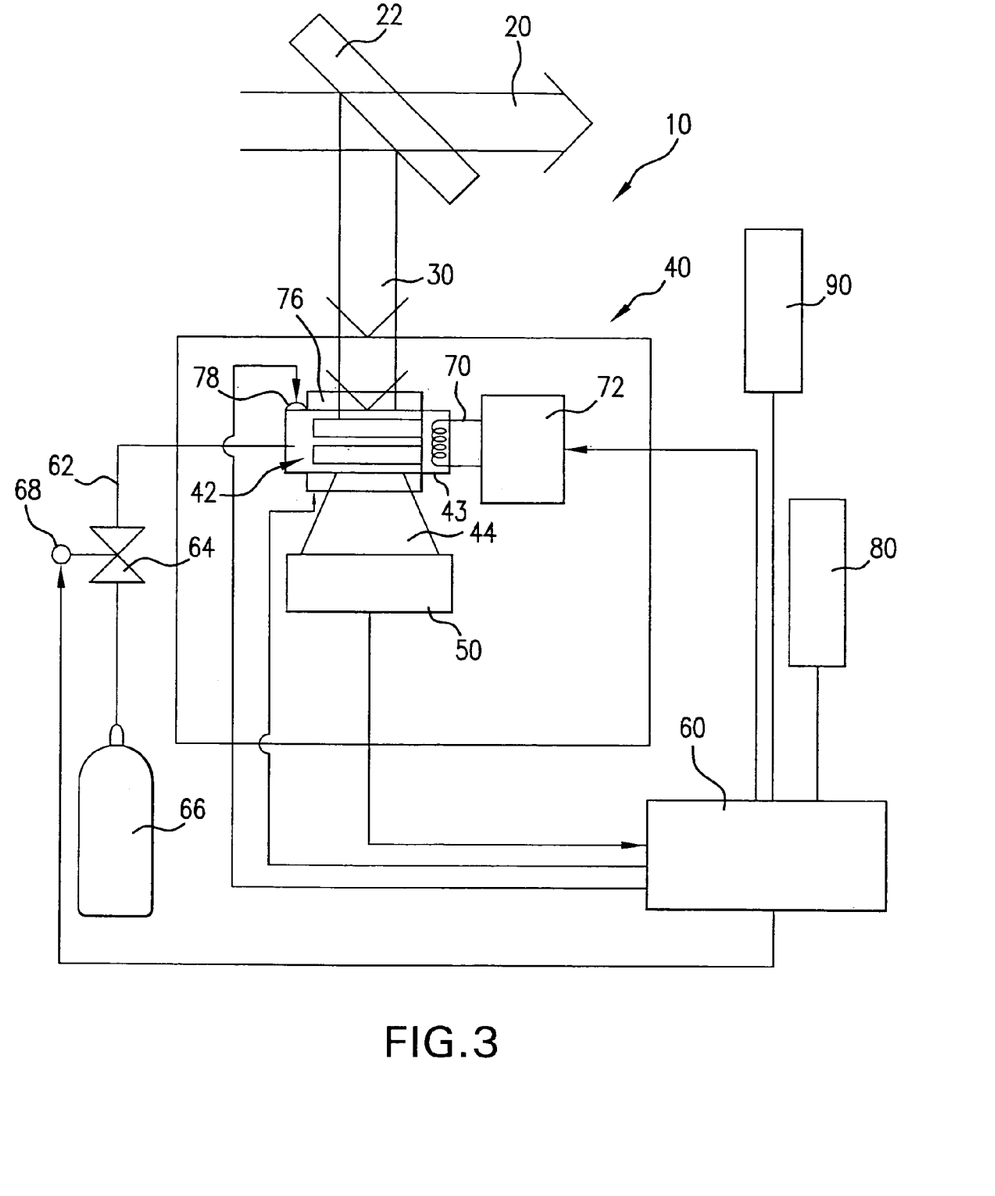
FIG. 3 is a schematic block diagram illustration of a bandwidth-meter according to aspects of an embodiment of the present invention.

Regarding the use of etalon spectrometers 40 as shown schematically in FIG. 3, that are of the fixed-spacer imaging type, these devices have the advantage that as long as at least one free spectral range (two adjacent fringe orders) can be imaged on a linear detector array, e.g., PDA 50 they can be used to capture spectral information in a single frame image independent of the central wavelength of the light, even if the wavelength is tuned from frame to frame. However, they have the disadvantage that Wan order at a large radius is the only one visible in a given frame, the local wavelength resolution (dλ/dR) on the detector is smaller than the optimum possible at small radius. According to aspects of an embodiment of the present invention, applicant proposes abetter use of the linear resolution olr the detector, that is enabled by providing a means with which to adjust the optical path length between the etalon reflectors to continually adjust the apparatus to present a visible order at a shallower angle. According to another aspect of an embodiment of the present invention, appliuant proposes a better use of the linear resolution of the detector that is enabled by choosing to measure an order already visible at a shallower angle, in the event that multiple orders are imaged on the detector. It will also be understood by those skilled in the art that the PDA may be a single scanned photodiode as noted elsewhere in this application.

According to aspects of an embodiment of the present invention applicant proposes to combine the features of both a scanning and fixed-gap etalon spectrometer for use in on-board high repetition rage gas discharge laser systems for pulse to pulse wavelength measurement with high accuracy using a linear array of photodiodes for detection of fringes and where having a sufficient pixel density for high enough resolution is an issue. The device may still be used in the fixed gap mode all of the time. However, when the central wavelength of the illuminating light is changed, the orders will move on the PDA detector. If the wavelength change is such that the only order fully visible is occurring at a large enough angle, the local linear dispersion across one detector element dλ=λ/f tan(R/f)dR will also be quite large. Applicant proposes a system and method to dynamically move this order back to a smaller value of θ=R/f where the dispersion dλ across one detector pixel is correspondingly smaller.

If the optical path length d between the etalon reflectors is changed, the orders will appear at different angles. A slow servomechanism can be employed to "steer" the order to a desired angle where the spatial resolving power of the detector photodiode array can be used most efficiently. For example, in an etalon spectrometer with a 10 pm FSR, approximately 0.1 µm of shift in d(=1.87 µm) has been found to be necessary to swap the position of two orders at θ=3 mrad. This will shift the FSR by less than 1 fm and will therefore have negligible impact on the instrument function.

According to aspects of an embodiment of the present invention, e.g., in order to use this wavemeter 40 as shown schematically in FIG. 3, as a further example, the imaging system and detector may be chosen such that the usable angles range from θ=3 mrad to θ=11 mrad. At θ=3 mrad the linear dispersion is such that the fringe is well characterized by a sufficient number of pixels to obtain the desired sampling resolution, depending on the application as will be understood by those skilled in the art. At theta=11 mrad the linear dispersion is such that the fringes are very narrow, falling across only ~27% of the number of pixels covered for the θ=3 mrad position.

Hence, the device while having sufficient sampling resolution to perform an accurate measurement at the shallow angle would not have sufficient sampling resolution at the large angle, unless ~4× overhead were built into the design.

Applicant proposes to a software modification to recognize this condition, e.g., by analyzing the image of the fringes recorded by the detector in a wavemeter calculation computer 60, which may be, e.g., a programmed computer or microcomputer of microcontroller suitably programmed. Applicant proposes that this computer can decide whether the fringe is in a position (e.g. at an angle θ) where the detector resolution is sufficient to allow accurate measurement, and if multiple fringes are present in the image, to decide to analyze preferentially that fringe which is in the position on the detector where the greatest sampling resolution is available. Applicant also proposes the provision of one of a number of etalon 42 controllers, discussed in more detail below, to slowly steer the fringe to the an optimal position or thereabouts by, e.g., adjusting the optical path length d. In the case where the laser wavelength is not tuned by large steps (<few pm) very often, this method can keep the wavemeter 40 performing in a region where the wavemeter 40 has sufficient pixel-resolution overhead. It would make practical the above-mentioned special techniques and others.

Those skilled in the art will understand that according to aspects of an embodiment of the present invention the problem of insufficient pixel sampling resolution in the wavemeter linear photodiode array 50, enabling the effective implementation of spectral asymmetry measurement/compensation regardless of the fringe read zone, is simply and easily solved by moving the fringe order to a shallower angle where the local pixel dispersion (dλ/dR) on the detector 50 is less. It retains the high-speed wavelength agility of the imaging spectrometer 40, but within a few measurement windows could move the fringe back to a situation of small radius, resulting in there being, e.g., about a 3× increase in pixels illuminated across the extent of the fringe seen by the PDA 50. Adjusting d to change the position of an order by <1 free spectral range has a negligible effect on the free spectral range itself, and hence the calibration of the wavemeter. This could be done with temperature or pressure, for example, with a metal diaphragm on a hermetically sealed housing containing the etalon pushed by a mechanical actuator.

Turning now to FIG. 3 there is shown an example of such a wavemeter 40 containing an etalon 42 and receiving a portion 30 of an output laser beam 20 reflected into the wavemeter 40 by a beam splitter 22 as is well known in the art. The split portion 30 may enter the etalon 42 and the etalon may produce a fringe pattern 44 imaged onto a photo diode array 50, which may provide to a center wavelength/bandwidth detection computer 60 the intensities seen on each of a plurality of photodiodes arranged, e.g., in a linear array. The fringe pattern may be steered to an appropriate place on the array 50 where it is dispersed enough for proper pixel resolution overhead, as noted above, e.g., by the application of pressure to the etalon housing 43, e.g., through a gas supply line 62 under the control of the computer, e.g., by the operation of a solenoid valve 64 with a solenoid 68 to pressurize the etalon housing 43, or by the application of pressure to, e.g., a diaphragm 78 on the housing, e.g., with a mechanical actuator (stepper motor, linear motor, etc. (not shown) again under the control of the computer 60. Alternatively a heater 70 under the control of a heater controller 72 may modify the temperature in the etalon housing 43 responsive to control signals generated by the computer 60. Also, the etalon angle of incidence may be modified slightly, e.g., by mounting the etalon housing on a rotating mounting plate 76 with an actuator (not shown), which also may be under the control of the computer 60.

The computer may also provide center bandwidth feedback information to a bandwidth controller (not shown), e.g., to modify the wavefront of the laser light, e.g., within a line narrowing unit as is well known in the art. another method of bandwidth modification may be by changing the inductance, e.g., in a compression head, e.g., in the circuit supplying electric discharge pulses to electrodes in the laser, as are used, as is well known in the art to create pulsed excimer of molecular fluorine gas discharge laser to create a lasing medium. A further bandwidth active correction method may be, e.g., in multichambered laser systems, e.g., a master oscillator (seed laser) poser amplifier ("MOPA") line narrowed laser system, to adjust the timing of the lasing in the MO and PA portions of the system. In this manner one can select the portion of the output laser pulse from the MO section to be amplified in the PA section. Different portions of the output laser pulse from the MO section can have different bandwidth, e.g., because they have transited the line narrowing unit more times and thus been more narrowed in bandwidth. By adjusting the timing between the occurrence of lasing in the MO section and in the Pa section one can selectively choose the portion of the MO output to be amplified in the PA section and thus select bandwidth up or down according to the received feedback. Other forms of multichambered laser systems may be used, e.g., a master oscillator power oscillator ("MOPO") and the term dtMOPA contemplates and is used to mean the selection of the respective occurrence of lasing between any such two multichambered line narrowed laser systems to selectively amplify a portion of a seed laser pulse according to the need to select a desired ultimate output laser pulse bandwidth.

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art. In addition to changes and modifications to the disclosed and claimed aspects of embodiments of the present invention(s) noted above others could be implemented.

I claim:

1. A bandwidth meter for measuring the bandwidth of a spectrum of light emitted from a laser input to the bandwidth meter comprising:
    an optical bandwidth monitor providing a first output representative of a first parameter which is indicative of the bandwidth of the light emitted from the laser and a second output representative of a second parameter which is indicative of the bandwidth of the light emitted from the laser; and,
    an actual bandwidth calculation apparatus utilizing the first output and the second output as part of a multivariable equation employing predetermined calibration variables specific to the optical bandwidth monitor, to calculate an actual bandwidth parameter;
    the multivariable equation comprising a symmetry sensitive term.

2. The apparatus of claim 1 further comprising:
    the actual bandwidth parameter comprises a spectrum full width at some percent of the maximum within the full width of the spectrum of light emitted from the laser ("FWXM").

3. The apparatus of claim 1, further comprising:
    the actual bandwidth parameter comprises a width between two points on the spectrum defining a content of the spectrum enclosing some percentage of the energy of the full spectrum of the spectrum of light emitted from the laser ("EX").

4. The apparatus of claim 1 further comprising:
    the bandwidth monitor comprises an etalon and the first output is representative of at least one of a width of a fringe of an optical output of the etalon at FWXM or a width between two points on the spectrum enclosing sonic percentage of the energy of the full spectrum of light emitted from the laser ("EX'") and the second output is representative of at least one of second FWX"M or EX'", where X≠X" and X'≠X'".

5. The apparatus of claim 2 further comprising:
    the bandwidth monitor comprises an etalon and the first output is representative of at least one of a width of a fringe of an optical output of the etalon at FWXM or a width between two points on the spectrum enclosing some percentage or the energy of the full spectrum or light emitted from the laser ("EX'") and the second output is representative of at least one of a second FWX"M or EX'", where X≠X" and X'≠X'".

6. The apparatus of claim 3 further comprising:
    the bandwidth monitor comprises an etalon and the first output is representative of at least one of a width of a fringe of an optical output of the etalon at FWXM or a width between two points on the spectrum enclosing some percentage of the energy of the full spectrum of light emitted from the laser ("EX'") and the second output is representative of at least one of a second FWX"M or EX'", where X≠X" and X"≠X'".

7. The apparatus of claim 4, further comprising:
    the precomputed calibration variables are derived from a measurement of the value of the actual bandwidth parameter utilizing a trusted standard, correlated to the occurrence of the first and second outputs for a calibration spectrum.

8. The apparatus of claim 5, further comprising:
    the precomputed calibration variables are derived from a measurement of the value of the actual bandwidth parameter utilizing a trusted standard, correlated to the occurrence of the first and second outputs for a calibration spectrum.

9. The apparatus of claim 6, further comprising:
    the precomputed calibration variables are derived from a measurement of the value of the actual bandwidth parameter utilizing a trusted standard, correlated to the occurrence of the first and second outputs for a calibration spectrum.

10. The apparatus of claim 7, further comprising:
    the value of the actual bandwidth parameter is calculated from the equation:

$$\text{estimated actual } BW \text{ parameter} = K^*w_1 + L^*w_2 + S,$$

where $W_1$=the first measured output representative of FWXM or EX' and $W_2$ is the second measured output representative of FWX"M or EX'" and S is the symmetry sensitive term.

11. The apparatus of claim 8, further comprising:
    the value of the actual bandwidth parameter is calculated from the equation:

$$\text{estimated actual } BW \text{ parameter} = K^*w_1 + L^*w_2 + S.$$

where $w_1$=the first measured output representative of FWXM or EX' and $W_2$ is the second measured output representative of FWX"M or EX' and S is the symmetry sensitive term.

12. The apparatus of claim 9, further comprising:
    the value of the actual bandwidth parameter is calculated from the equation:

$$\text{estimated } BW \text{ parameter} = K^*w_1 + L^*w_2 + S,$$

where $w_1$=the first measured output representative of FWXM or EX' and $W_2$ is the second measured output representative of FWX"M or EX'" and S is the symmetry sensitive term.

13. The of claim 10 further comprising:
    the symmetry sensitive term comprises an error correction for error in the actual bandwidth parameter due to asymmetry in the spectrum of light emitted from the laser.

14. The of claim 11 further comprising:
    the symmetry sensitive term comprises an error correction for error in the actual bandwidth parameter due to asymmetry in the spectrum of light emitted from the laser.

15. The of claim 12 further comprising:
    the symmetry sensitive term comprises an error correction for error in the actual bandwidth parameter due to asymmetry in the spectrum of light emitted from the laser.

16. The apparatus of claim 10 further comprising:
    the symmetry sensitive term comprising the difference between midpoint positions, in wavelength space, of each of the first parameter and the second parameter.

17. The apparatus of claim 11 further comprising:
    the symmetry sensitive term comprising the difference between midpoint positions, in wavelength space, of each of the first parameter and the second parameter.

18. The apparatus of claim 12 further comprising:
the symmetry sensitive term comprising the difference between midpoint positions, in wavelength space, of each of the first parameter and the second parameter.

19. The apparatus of claim 13 further comprising:
the symmetry sensitive term comprising the difference between midpoint positions, in wavelength space, of each of the first parameter and the second parameter.

20. The apparatus of claim 14 further comprising:
the symmetry sensitive term comprising the difference between midpoint positions, in wavelength space, of each of the first parameter and the second parameter.

21. The apparatus of claim 15 further comprising:
the symmetry sensitive term comprising the difference between midpoint positions, in wavelength space, of each of the first parameter and the second parameter.

22. The apparatus of claim 16 further comprising:
the first parameter and the second parameter are selected to be far enough apart to be sufficiently sensitive to small asymmetries in a fringe pattern utilized to measure the first parameter and the second parameter.

23. The apparatus of claim 17 further comprising:
the first parameter and the second parameter are selected to be far enough apart to be sufficiently sensitive to small asymmetries in a fringe pattern utilized to measure the first parameter and the second parameter.

24. The apparatus of claim 18 further comprising:
the first parameter and the second parameter are selected to be far enough apart to be sufficiently sensitive to small asymmetries in a fringe pattern utilized to measure the first parameter and the second parameter.

25. The apparatus of claim 19 further comprising:
the first parameter and the second parameter are selected to be far enough apart to be sufficiently sensitive to small asymmetries in a fringe pattern utilized to measure the first parameter and the second parameter.

26. The apparatus of claim 20 further comprising:
the first parameter and the second parameter are selected to be far enough apart to be sufficiently sensitive to small asymmetries in a fringe pattern utilized to measure the first parameter and the second parameter.

27. The apparatus of claim 21 further comprising:
the first parameter and the second parameter are selected to be far enough apart to be sufficiently sensitive to small asymmetries in a fringe pattern utilized to measure the first parameter and the second parameter.

28. A bandwidth meter comprising:
an optically dispersive instrument, dispersing the energy comprising the output of a laser light source into a spatial or temporal domain according to the wavelength distribution of the energy of the laser light source;
a detector, recording, respectively, the spatial or temporal variation of wavelength distribution of the energy and providing an output signal based upon the recorded spatial or temporal variation;
a first calculation apparatus calculating the width of the wavelength distribution of the energy, respectively, in the space or time domain, bused upon, respectively, the spatial or temporal variation of the wavelength distribution of the energy recorded by the detector, and converting, respectively, the spatial or temporal distribution into the wavelength domain according to the optical properties of the dispersive instrument; and
a second calculation apparatus, utilizing at least one width of the wavelength distribution of the energy in the wavelength domain, calculated by the first calculation apparatus, by applying the at least one width us an argument of a multivariable equation having predetermined calibration variables specific to the optical source, the dispersive instrument, the detector, and the at least one width taken as an argument;
the multivariable equation comprising a symmetry term.

29. The apparatus of claim 28 further comprising:
the first calculation apparatus and the second calculation apparatus comprise the same calculation apparatus.

30. The apparatus of claim 28 further comprising:
the at least one width is at least two widths selected from the group comprising a spectrum full width at some percent of the maximum within the full width of the spectrum of light emitted from the light source ("FWXM") and ("FWX"M"), and a width between two points on the spectrum defining a content of the spectrum enclosing some percentage of the energy of the full spectrum of the spectrum of light emitted from the light source ("EX'''") and ("EX''''"), where $X \neq X'$ and $X'' \neq X'''$.

31. The apparatus of claim 29 further comprising:
the at least one width is at least two widths selected from the group comprising a spectrum full width at some percent of the maximum within the full width of the spectrum of light emitted from the light source ("FWXM") and ("FWX'M"), and a width between two points on the spectrum defining a content of the spectrum enclosing some percentage of the energy of the full spectrum of the spectrum of light emitted from the light source ("EX''''") or ("EX''''"), where $X \neq X'$ and $X'' \neq X'''$.

32. The apparatus of claim 28 further comprising:
wherein the multivariable equation is evaluated to calculate an actual bandwidth parameter descriptive of the spectral distribution of the energy output by the light source selected from the group FWX*M, FX**.

33. The apparatus of claim 29 further comprising:
wherein the multivariable equation is evaluated to calculate an actual bandwidth parameter descriptive of the spectral distribution of the energy output by the light source selected from the group FWX*M, EX**.

34. The apparatus of claim 30 further comprising:
wherein the multivariable equation is evaluated to calculate an actual bandwidth parameter descriptive of the spectral distribution of the energy output by the light source selected from the group FWX*M, EX**, wherein X* may equal either X or X' and X** may equal either X" or X'".

35. The apparatus of claim 31 further comprising:
wherein the multivariable equation is evaluated to calculate an actual bandwidth parameter descriptive of the spectral distribution of the energy output by the light source selected from the group FWX*M, EX**, wherein X* may equal either X or X' and X** may equal either X" or X".

36. The of claim 32 further comprising:
the symmetry sensitive term comprises an error correction for error in the actual bandwidth parameter due to asymmetry in the spectrum of light emitted from the laser.

37. The of claim 33 further comprising:
the symmetry sensitive term comprises an error correction for error in the actual bandwidth parameter due to asymmetry in the spectrum of light emitted from the laser.

38. The of claim 34 further comprising;
the symmetry sensitive term comprises an error correction for error in the actual bandwidth parameter clue to asymmetry in the spectrum of light emitted from the laser.

39. The of claim 35 further comprising:
the symmetry sensitive term comprises an error correction for error in the actual bandwidth parameter due to asymmetry in the spectrum of light emitted from the laser.

40. The apparatus of claim 32 further comprising:
the symmetry sensitive term comprising the difference between midpoint positions, in wavelength space, of each of the first parameter and the second parameter.

41. The apparatus of claim 33 further comprising:
the symmetry sensitive term comprising the difference between midpoint positions, in wavelength space, of each of the first parameter and the second parameter.

42. The apparatus of claim 34 further comprising:
the symmetry sensitive term comprising the difference between midpoint positions, in wavelength space, of each of the first parameter and the second parameter.

43. The apparatus of claim 35 further comprising:
the symmetry sensitive term comprising the difference between midpoint positions, in wavelength space, of each of the first parameter and the second parameter.

44. The apparatus of claim 36 further comprising:
the symmetry sensitive term comprising the difference between midpoint positions, in wavelength space, of each of the first parameter and the second parameter.

45. The apparatus of claim 37 further comprising:
the symmetry sensitive term comprising the difference between midpoint positions, in wavelength space, of each of the first parameter and the second parameter.

46. The apparatus of claim 38 further comprising:
the first parameter and the second parameter are selected to be far enough apart to be sufficiently sensitive to small asymmetries in a fringe pattern utilized to measure the first parameter and the second parameter.

47. The apparatus of claim 39 further comprising:
the first parameter and the second parameter are selected to be far enough apart to be sufficiently sensitive to small asymmetries in a fringe pattern utilized to measure the first parameter and the second parameter.

48. The apparatus of claim 40 further comprising:
the first parameter and the second parameter are selected to be far enough apart to be sufficiently sensitive to small asymmetries in a fringe pattern utilized to measure the first parameter and the second parameter.

49. The apparatus of claim 41 further comprising:
the first parameter and the second parameter are selected to be far enough apart to be sufficiently sensitive to small asymmetries in a fringe pattern utilized to measure the first parameter and the second parameter.

50. The apparatus of claim 42 further comprising:
the first parameter and the second parameter are selected to be far enough apart to be sufficiently sensitive to small asymmetries in a fringe pattern utilized to measure the first parameter and the second parameter.

51. The apparatus of claim 43 further comprising:
the first parameter and the second parameter are selected to be far enough apart to be sufficiently sensitive to small asymmetries in a fringe pattern utilized to measure the first parameter and the second parameter.

52. The apparatus of claim 44 further comprising:
the first parameter and the second parameter are selected to be far enough apart to he sufficiently sensitive to small asymmetries in a fringe pattern utilized to measure the first parameter and the second parameter.

53. The apparatus of claim 44 further comprising:
the first parameter and the second parameter are selected to be far enough apart to be sufficiently sensitive to small asymmetries in a fringe pattern utilized to measure the first parameter and the second parameter.

54. A bandwidth meter for measuring the bandwidth of a spectrum of light emitted from a laser input to the bandwidth meter comprising:
an optical bandwidth monitor providing a first output representative of a first parameter which is indicative of the bandwidth of the light emitted from the laser and a second output representative of a second parameter which is indicative of the bandwidth of the light emitted from the laser; and,
an actual bandwidth calculation apparatus utilizing the first output and the second output as part of a multivariable equation employing predetermined calibration variables specific to the optical bandwidth monitor, to calculate an actual bandwidth parameter;
the multivariable equation comprising:

$$E95\sim = A(x,y)*FWx\%+B(x,y)*FWy\%+C(A,B,x,y)*(\text{midpoint}(X\%)-\text{midpoint}(y\%))+D.$$

55. A spectrometer for use in on-board high repetition rage gas discharge laser systems for pulse to pulse wavelength measurement with high accuracy using a linear array or photodiodes for detection of fringes comprising:
an etalon providing a fringe pattern to the linear array of photodiodes;
a fringe order positioning mechanism moving an order of the fringe pattern order being measured to a more favorable position on the photodiode array.

56. The apparatus of claim 55 further comprising:
the fringe order positioning mechanism positioning the fringe order to a shallower angle where the local linear dispersion ($d\lambda/dR$) on the linear array is sufficiently small.

57. The apparatus of claim 55 further comprising:
the fringe order positioning mechanism is operated in response to a signal from a bandwidth measurement computer.

58. The apparatus of claim 56 further comprising:
the fringe order positioning mechanism is operated in response to a signal from a bandwidth measurement computer.

59. The apparatus of claim 57 further comprising:
the signal from the bandwidth measurement computer is generated upon detection of an unfavorable fringe order local linear dispersion.

60. The apparatus of claim 58 further comprising:
the signal from the bandwidth measurement computer is generated upon detection of an unfavorable fringe order local linear dispersion.

* * * * *